(12) United States Patent
Cheng et al.

(10) Patent No.: US 10,601,043 B2
(45) Date of Patent: Mar. 24, 2020

(54) ELECTROCHEMICALLY MODIFIED CARBON MATERIAL FOR LITHIUM-ION BATTERY

(71) Applicant: NEC Corporation, Tokyo (JP)

(72) Inventors: Qian Cheng, Tokyo (JP); Noriyuki Tamura, Tokyo (JP); Kentaro Nakahara, Tokyo (JP)

(73) Assignee: NEC Corporation, Tokyo (JP)

( * ) Notice: Subject to any disclaimer, the term of this patent is extended or adjusted under 35 U.S.C. 154(b) by 342 days.

(21) Appl. No.: 15/506,813

(22) PCT Filed: Aug. 29, 2014

(86) PCT No.: PCT/JP2014/073421
§ 371 (c)(1),
(2) Date: Feb. 27, 2017

(87) PCT Pub. No.: WO2016/031083
PCT Pub. Date: Mar. 3, 2016

(65) Prior Publication Data
US 2017/0288224 A1 Oct. 5, 2017

(51) Int. Cl.
*H01M 4/587* (2010.01)
*H01M 4/133* (2010.01)
(Continued)

(52) U.S. Cl.
CPC .............. *H01M 4/587* (2013.01); *C01B 32/00* (2017.08); *C01B 32/182* (2017.08);
(Continued)

(58) Field of Classification Search
CPC .......... H01M 10/052; H01M 10/0525; H01M 2004/027; H01M 4/133; H01M 4/1393; H01M 4/364; H01M 4/38; H01M 4/587
See application file for complete search history.

(56) References Cited

U.S. PATENT DOCUMENTS 5,723,232 A * 3/1998 Yamada ................. H01M 4/02
429/231.8
2009/0111031 A1* 4/2009 Hirose ................. H01M 4/134
429/332
(Continued)

FOREIGN PATENT DOCUMENTS

JP 55-62807 5/1980
JP 58-161913 9/1983
(Continued)

OTHER PUBLICATIONS

J. O. Besenhard, E. Wudy, H. Mohwald, J. J. Nickl, W. Biberacher, W. Foag. Anodic Oxidation of Graphite in H2SO4: Dilatometry, In Situ X-ray Diffraction, Impedance Spectroscopy, Synthetic Metals 1983, 7, 185-192.*
(Continued)

*Primary Examiner* — Carlos Barcena
(74) *Attorney, Agent, or Firm* — Finnegan, Henderson, Farabow, Garrett & Dunner, L.L.P.

(57) ABSTRACT

The present invention provides an anode material for a lithium-ion battery comprising a carbon particle having a particle size of 5 μm to 30 μm, and including defective portions on a surface of the carbon particle, the defective portions being holes or pores formed by anodic oxidation of the carbon particle.

11 Claims, 4 Drawing Sheets

(51) Int. Cl.

| | |
|---|---|
| *H01M 4/38* | (2006.01) |
| *H01M 4/36* | (2006.01) |
| *H01M 4/1393* | (2010.01) |
| *H01M 10/0525* | (2010.01) |
| *H01M 10/052* | (2010.01) |
| *C01B 32/182* | (2017.01) |
| *C01B 32/00* | (2017.01) |
| *H01M 4/02* | (2006.01) |

(52) U.S. Cl.
CPC ......... *H01M 4/133* (2013.01); *H01M 4/1393* (2013.01); *H01M 4/364* (2013.01); *H01M 4/38* (2013.01); *H01M 10/052* (2013.01); *H01M 10/0525* (2013.01); *C01B 2204/22* (2013.01); *C01P 2004/61* (2013.01); *H01M 2004/027* (2013.01)

(56) References Cited

U.S. PATENT DOCUMENTS

| | | | |
|---|---|---|---|
| 2009/0258298 A1* | 10/2009 | Umeno | C04B 35/62839 429/231.8 |
| 2013/0266849 A1* | 10/2013 | Hara | H01M 4/364 429/179 |
| 2014/0227600 A1 | 8/2014 | Kachi | |
| 2016/0006020 A1 | 1/2016 | Tamaki et al. | |

FOREIGN PATENT DOCUMENTS

| | | |
|---|---|---|
| JP | 59-3015 | 1/1984 |
| JP | 6-275271 | 9/1994 |
| JP | 2000-53408 A | 2/2000 |
| JP | 2012-131691 A | 7/2012 |
| WO | WO 2007/069664 A1 | 6/2007 |
| WO | WO 2013/027686 A1 | 2/2013 |
| WO | WO 2014/065241 A1 | 5/2014 |
| WO | WO 2014/129594 A1 | 8/2014 |

OTHER PUBLICATIONS

K. Horita, Y. Nishibori, T. Ohsima. Surface Modification of Carbon Black by Anodic Oxidation and Electrochemical Characterization, Carbon 1996, 34(2), 217-222.*

Sorokina, N. V. Maksimova, V. V. Avdeev. Anodic Oxidation of Graphite in 10 to 98% HNO3, Inorganic Materials 2001, 37(4), 360-365.*

Decision to Grant a Patent dated Jul. 31, 2018, and an English-language machine translation, issued by the Japanese Patent Office in counterpart Japanese Patent Application No. 2017-511957.

Notification of Reasons for Refusal issued by Japanese Patent Office in counterpart Japanese Patent Application No. 2017-511957, dated Jan. 16, 2018.

International Search Report and Written Opinion dated Nov. 18, 2014, in corresponding PCT International Application.

* cited by examiner (A)

(B)

(C)

(A)

(B)

ELECTROCHEMICALLY MODIFIED CARBON MATERIAL FOR LITHIUM-ION BATTERY

CROSS-REFERENCE TO RELATED PATENT APPLICATIONS

This application is a National Stage Entry of International Application No. PCT/JP2014/073421, filed Aug. 29, 2014. The entire contents of the above-referenced application are expressly incorporated herein by reference.

TECHNICAL FIELD

The present invention relates to an electrically modified carbon material used as a negative electrode active (anode) material of a lithium-ion battery.

BACKGROUND ART

A lithium-ion battery (sometimes LIB) is a member of rechargeable (secondary) battery types in which lithium ions move from a negative electrode to a positive electrode during discharge and back when charging.

LIBs have become integral to modern day portable electronic devices such as laptop computers and cellular phones. Moreover, with the advent of electric vehicles (EV) and plug-in hybrid electric vehicles (PHEV), there is a great demand for developing high energy density LIBs capable of long cruising distance of EVs and PHEVs.

Three kinds of carbons: graphite, soft carbon and hard carbon have been used for commercial LIBs as a negative electrode active material. Graphite may intercalate up to a maximum of one lithium atom per six carbon atoms under ambient conditions. Many of soft carbons heat-treated around 1200° C. show a maximum reversible capacity of about 300 mAh/g. Some hard carbons can intercalate up to over one lithium atom per six carbon atoms. From earlier reports of 400 mAh/g of reversible capacity, improvement of reversible capacity without an increase of irreversible capacity has been attempted and over 500 mAh/g of reversible capacity with a small irreversible capacity of about 60 mAh/g has been achieved.

Graphite is a three-dimensional ordered crystal. Soft carbon and hard carbon are constructed with two-dimensional ordered graphene sheets which are randomly stacked, that are called as a 'turbostratic' structure. Soft carbon is called as a graphitizing carbon because it can be relatively easily graphitized by heat treatment over 2000° C. On the other hand, hard carbon is hardly to be graphitized, even at 3000° C. under ambient pressure, so it is called as a hardly-graphitizable or non-graphitizing carbon. The raw material usually determines whether such a carbon is obtained under soft or hard condition.

Typical raw materials for soft carbon include petroleum pitch and coal tar pitch. Acenaphthylene can be used in the laboratory as a substitute for pitch. Hard carbon is obtainable by heat treating thermosetting resins such as phenolic resin, and vegetable fibers such as coconut shell. Some carbon materials heat treated at about 800° C. or less have a large capacity, but their discharging potential is too high to be used in current cells that the cell voltage will be lower than 3 V. The lithium-doping mechanism of these carbon materials is different from the mechanism under consideration here.

Furthermore, there is an increased demand for a high capacity as well as high lithiation rate capability with regard to negative electrode active (anode) materials for lithium ion batteries. In order to meet the demand, attempts were made to use metals or elements, such as Si and Sn, which can make an alloy with lithium as the anode material. Such metals or elements have a higher theoretical charge and discharge capacity than carbonaceous materials. However, such metals or elements have serious changes in volume, accompanied with charging/discharging of lithium and resulting in metal based anode active materials to creak and pulverize. Thus, when charging/discharging cycles are repeated, the metal based anode active materials show a sudden deterioration of capacity and a shorter cycle life.

SUMMARY OF THE INVENTION

In order to solve these problems, a new attempt has been made to improve the capacity and rate capability of carbon based materials (graphite, soft carbon, hard carbon) by means of electrochemical modification of carbon particles to modify their morphology and crystal structure for higher capacity and better rate capability.

That is, one aspect of the present invention provides an anode material for a lithium-ion battery comprising a carbon particle having a particle size of 5 μm to 30 μm, and including defective portions on a surface of the carbon particle, the defective portions being holes or pores formed by anodic oxidation of the carbon particle.

Another aspect of the present invention provides a method for preparing an anode material including: soaking carbon particles having a particle size of 5 μm to 30 μm into an electrolytic solution; anodically oxidizing the carbon particles to form defective portions on surfaces of the carbon particles; and collecting the carbon particles after the anodically oxidizing.

Still another aspect of the present invention provides a lithium ion battery including the above anode material.

The aspect of the present invention can provide an anode material for a lithium ion battery that is excellent in capacity and rate capability.

MODES FOR CARRYING OUT THE INVENTION

The invention will be now described herein with reference to illustrative embodiments.

The present invention proposes to activate the basal and edge site of carbon materials with many defective portions, such as holes, pores, and the like by anodic oxidation. Reaction sites and Li-ion pathways can be increased after the activation, so as to increase the capacity and rate capability.

Regarding to the holes and pores, they can be formed on the top graphene layer or first several (2-10) graphene layers, which form a multi-channel structure that benefit for the higher capacity and better Li-ion input properties.

There is no special restriction for the size of electrochemical etched holes. The capacity and rate capability vary with hole size. The hole size is preferably smaller than 1 μm, more preferably smaller than 500 nm, and most preferably smaller than 100 nm.

For the density of holes, it is sufficient to increase the rate capability if the hole density is higher than 2 to 3 holes per μm$^2$. However, the higher hole density will cause more increase of the surface area resulting in increase of unfavorable side effects.

For the distribution of holes, it is preferred to have a hole distance between 3 to 5 μm, the uniform distribution of holes on the surface of carbon is the most preferred for a better rate capability.

This patent describes electrochemically modified carbon particles to use as lithium ion battery anode materials. The size of the carbon materials is between 5 to 30 μm with electrochemical etched pores (with the size smaller than 1 μm, preferably smaller than 500 nm, and most preferably smaller than 100 nm).

The raw carbon materials can be selected from particles of nature graphite, artificial graphite, meso-carbon micro-bead (MCMB), graphitic coke, meso-phase carbon, hard carbon, soft carbon, polymeric carbon, carbon or graphite fiber segments, carbon nano-fiber for graphitic nano-fiber, carbon nano-tube, or a combination thereof.

Figure 1:
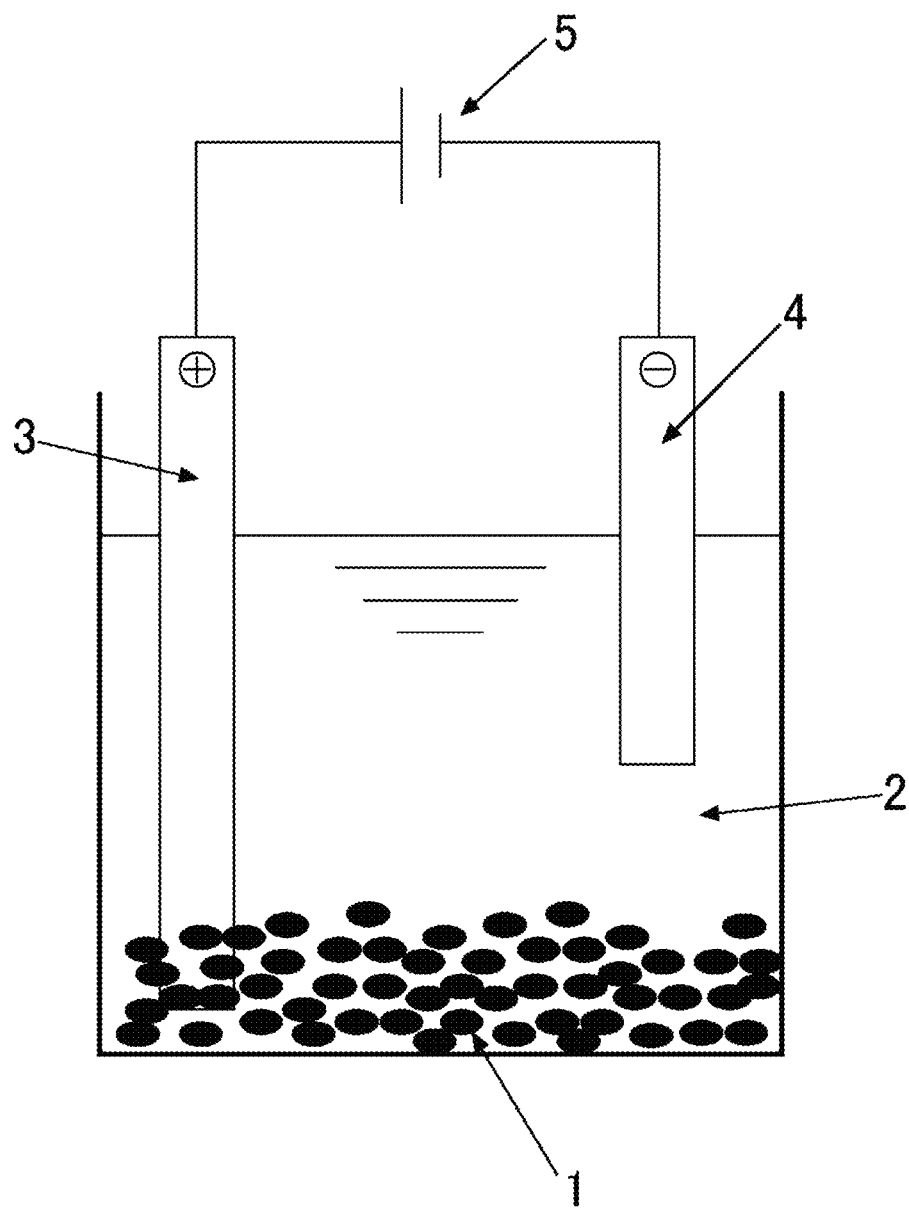
FIG. 1: Schematic diagram of experimental set-up for preparing electrochemically modified carbon materials.

The electrochemically modified carbon material can be prepared by anodic etching of the raw carbon material in an electrolytic solution. For example, FIG. 1 shows a schematic diagram of experimental set-up for preparing electrochemically modified carbon materials. Carbon materials 1 are soaked in electrolytic solution 2 and the electrochemical etching is performed by using working electrode 3 in contact with the soaked carbon materials 1 and counter electrode 4 with applying predetermined potential from power source 5. As for the electrolytic solution, but not restricted, organic and inorganic acid solutions may be used. Examples of the organic acid solution include aqueous solutions of carboxylic acids such as acetic acid and oxalic acid, and examples of the inorganic acid solution include aqueous solutions of sulfuric acid, hydrochloric acid and nitric acid. The acid concentration can be arbitrarily controlled and preferably 5 moles/litter (M/L) or less, more preferably 3 M/L or less and most preferably 1 M/L or less.

The carbon particles are collected and washed to remove the electrolytic solution. The collected carbon particles can be further heat treated under inert atmosphere such as argon, nitrogen or the like. The heat treatment can be carried out at a temperature range of 600° C. to 1400° C., preferably 800° C. to 1200° C. for 0.5 to 24 hours.

The electrochemically modified carbon material preferably further includes anode active particles which are capable of absorbing and desorbing lithium ions. Examples of the anode active particles include: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements, wherein the alloys or intermetallic compounds are stoichiometric or nonstoichiometric; (c) oxides, carbides, nitrides, sulfides, phosphides, selenides, and tellurides of Si, Ge, Sn, Pb, Sb, Bi, Zn, Al, Fe, Ti, Ni, Co, or Cd, and their mixtures or composites; and (d) combinations thereof. There is essentially no constraint on the type and nature of the anode active particles that can be used in practicing the present invention. Among them, metal or semi-metal particles or compound particles of at least one element selected from a group consisting of Si, Sn, Al, Ge and Pb are preferable.

The electrochemically modified carbon material may be coated with a thin layer of carbon after combining with active materials, such as Si, Sn, etc. For instance, micron-, sub-micron-, or nano-scaled particles or rods, such as $SnO_2$ nano particles, may be decorated on the surface of electrochemically modified carbon material to form a composite material. Then the composite material may be coated with carbon by pyrolysis of hydrocarbons such as sugar or using CVD method.

As for the positive electrode active material, but there is also no particular restriction on the type or nature thereof, known cathode materials can be used for practicing the present invention. The cathode materials may be at least one material selected from the group consisting of lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphates, metal sulfides, and combinations thereof. The positive electrode active material may also be at least one compound selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$) and lithium manganese oxide (e.g., $LiMn_2O_4$ and $LiMnO_2$) because these oxides provide a high cell voltage. Lithium iron phosphate is also preferred due to its safety feature and low cost. All these cathode materials can be prepared in the form of a fine powder, nano-wire, nano-rod, nano-fiber, or nano-tube. They can be readily mixed with an additional conductor such as acetylene black, carbon black, and ultra-fine graphite particles.

For the preparation of an electrode, a binder can be used. Examples of the binder include polytetrafluoroethylene (PTFE), polyvinylidene fluoride (PVDF), ethylene propylenediene copolymer (EPDM), or styrene-butadiene rubber (SBR). The positive and negative electrodes can be formed on a current collector such as copper foil for the negative electrode and aluminum or nickel foil for the positive electrode. However, there is no particularly significant restriction on the type of the current collector, provided that the collector can smoothly path current and have relatively high corrosion resistance. The positive and negative electrodes can be stacked with interposing a separator therebetween. The separator can be selected from a synthetic resin nonwoven fabric, porous polyethylene film, porous polypropylene film, or porous PTFE film.

A wide range of electrolytes can be used for manufacturing the cell. Most preferred are non-aqueous and polymer gel electrolytes although other types can be used. The non-aqueous electrolyte to be employed herein may be produced by dissolving an electrolyte (salt) in a non-aqueous solvent. Any known non-aqueous solvent which has been employed as a solvent for a lithium secondary battery can be employed. A mixed solvent comprising ethylene carbonate (EC) and at least one kind of non-aqueous solvent whose melting point is lower than that of ethylene carbonate and whose donor number is 18 or less (hereinafter referred to as a second solvent) may be preferably employed as the non-aqueous solvent. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous solvent solely composed of ethylene carbonate (EC) is advantageous in that it is relatively stable against decomposition through a reduction by a graphitized carbonaceous material. However, the melting point of EC is relatively high, 39-40° C., and the viscosity thereof is relatively high, so that the conductivity thereof is low, thus making EC alone unsuited for use as a secondary battery electrolyte to be operated at room temperature or lower. The second solvent to be used in the mixed solvent with EC functions to make the viscosity of the mixed solvent lowering than that of which EC is used alone, thereby improving an ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage. Preferable second solvents are dimethyl carbonate (DMC), methyl ethyl carbonate (MEC), diethyl carbonate (DEC), ethyl propionate, methyl propionate, propylene carbonate (PC), γ-butyrolactone (γ-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C. The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

EXAMPLES

Example 1 (Anodic Electrochemical Modification of Graphite)

Figure 2:
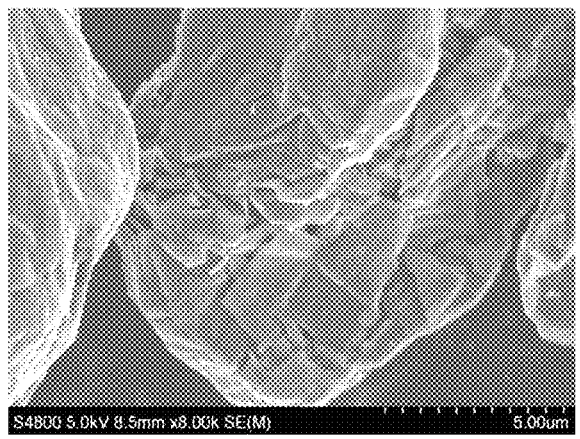
FIG. 2: SEM images of electrochemically modified graphite particles of sample 1.
Figure 2:
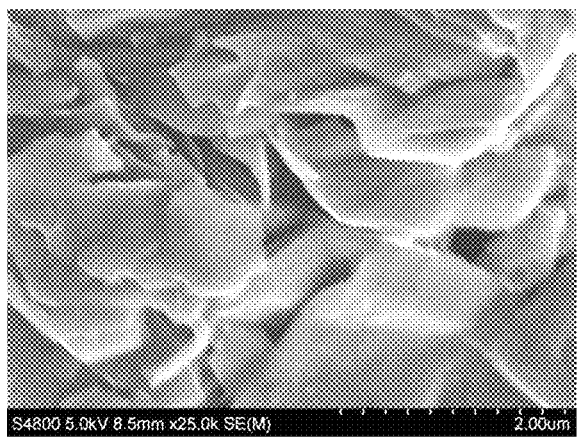
Figure 2:
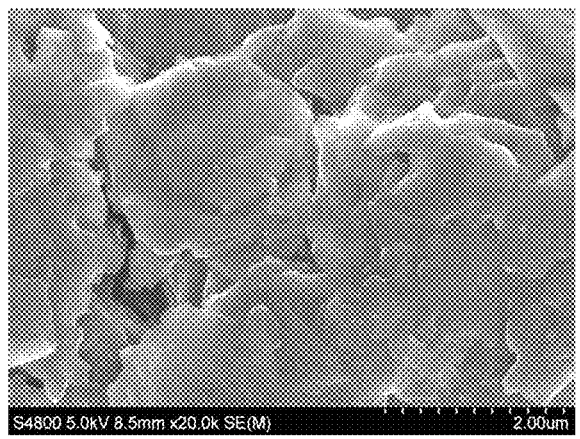

10 g of graphite particles having diameter of about 13 μm were soaked in an electrolytic solution of 1M $H_2SO_4$ for 1 hour. A Pt electrode was used to contact with graphite particles as a working electrode. A graphite rod was used as a counter electrode. A constant voltage of 10 V was applied between the working electrode 3 and the counter electrode 4 as shown in FIG. 1. Gases generated on both working and counter electrodes. The graphite particles were anodically activated for 6 hours. The resultant products were filtered out, washed with deionized water until pH=7 and dried in vacuum oven. FIGS. 2A to 2C show scanning electron microscope (SEM) images of electrochemically modified graphite particles (sample 1).

Example 2 (Heat Treatment of Sample 1)

Sample 1 prepared in Example 1 was further subjected to heat treatment at 800° C. for 3 hours in an inert atmosphere. The resultant product (sample 2) was used for example 2.

Comparative Example 1 (Conventional Graphite)

Figure 3:
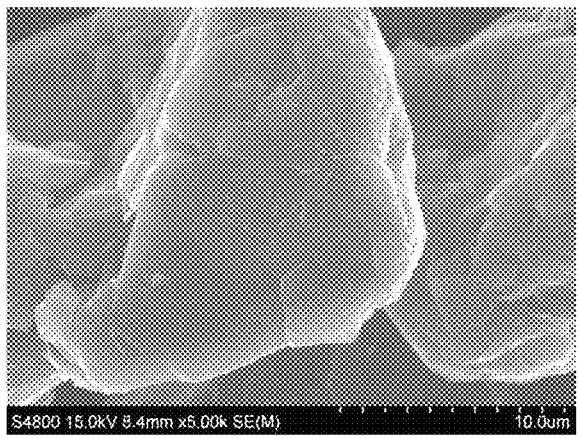
FIG. 3: SEM images of graphite particles of comparative sample 1.
Figure 3:
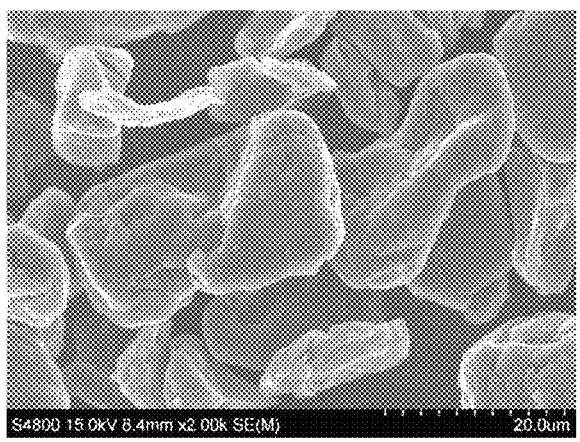

Sphere-shaped graphite particles (comparative sample 1) with the average particles size of 13 μm used in Example 1 as a starting material was used for comparative example 1. FIGS. 3A and 3B show scanning electron microscope (SEM) images of unmodified graphite particles (comparative sample 1).

Comparative Example 2 (Conventional Graphite after Heat Treatment)

Sphere-shaped graphite particles which are used in comparative example 1 were subjected to heat treatment at 800° C. for 3 hours in an inert atmosphere. The resultant product (comparative sample 2) was used for comparative example 2.

Figure 4:
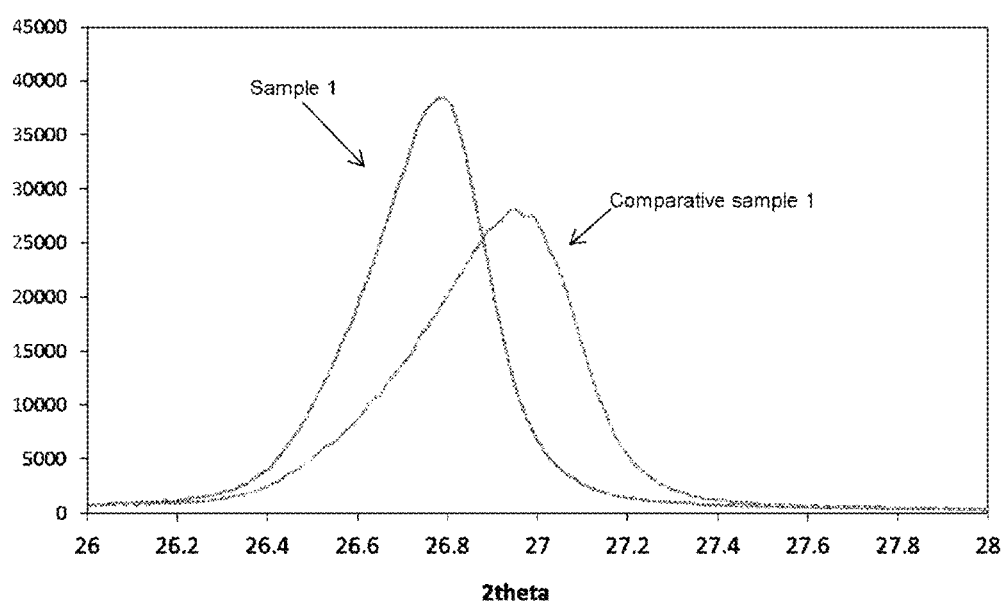
FIG. 4: XRD comparison of electrochemically modified graphite (sample 1) and unmodified graphite (comparative sample 1).

X-Ray Diffraction (XRD) Comparison:

XRD comparison of electrochemically modified graphite (sample 1) and unmodified graphite (comparative sample 1) shows in FIG. 4. The peak of sample 1 is sifted to low degree compared with that of comparative sample 1. This shifting phenomenon means that the interlayer space in sample 1 is larger than 0.335 nm that is a theoretical interlayer space of graphite.

Fabrication of a Test Cell

Each sample prepared in Example 1 to 2 and Comparative example 1, carbon black, and PVDF were mixed in a weight ratio of 92:1:7 and the resultant mixture was dispersed in N-methylpyrrolidone (NMP) to prepare a negative slurry.

The negative slurry was coated on a Cu foil as a current collector, dried at 120° C. for 15 min, pressed to 45 μm thick with a load of 50 g/m$^2$ and cut into 22×25 mm to prepare a negative electrode. The negative electrode as a working electrode and a metal lithium foil as a counter electrode were stacked by interposing porous polypropylene film therebetween as a separator. The resultant stack and an electrolyte prepared by dissolving 1M $LiPF_6$ in a mixed solvent of diethyl carbonate (DEC) and ethylene carbonate (EC) in a volume ratio of 1:1 were sealed into an aluminum laminate container to fabricate a test cell.

The test cell was evaluated in initial charge capacity, efficiency and rate capability of 1 C charge/0.1 C discharge. Results are shown in Table 1.

TABLE 1

| | | Capacity (mAh/g) | Efficiency (%) | Rate capability 1 C/0.1 C |
|---|---|---|---|---|
| Graphite base | Example 1 | 309.0 | 90.5 | 1.2% |
| | Example 2 | 368.0 | 90.6 | 11.0% |
| | Comp. Ex. 1 | 333.2 | 91.2 | 5.9% |
| | Comp. Ex. 2 | 330.0 | 91.6 | 5.5% |

Example 1 where the carbon particle has been only subjected to electrochemical modification shows inferior properties than the pristine graphite material (Comparative Example 1). However, the electrochemically modified carbon after heat treatment increased a lot of both capacity and rate capability.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. An anode material for a lithium-ion battery comprising a carbon particle having a particle size of 5 μm to 30 μm, and including defective portions on a surface of the carbon particle, the defective portions being holes or pores formed by anodic oxidation of the carbon particle, wherein a density of the defective portions is 2 to 3 portions per μm$^2$.

2. An anode material for a lithium-ion battery comprising a carbon particle having a particle size of 5 μm to 30 μm, and including defective portions on a surface of the carbon particle, the defective portions being holes or pores formed by anodic oxidation of the carbon particle;
   wherein the size of holes or pores is distributed between 500 nm and 1 μm and the carbon particle includes a layer of graphenes having an interlayer space larger than 0.335 nm; and
   wherein a density of the defective portions is 2 to 3 portions per μm$_2$.

3. The anode material according to claim 2, wherein the carbon particle has been subjected to heat treatment after the anodic oxidation.

4. The anode material according to claim 2, further comprising anode active particles which are capable of absorbing and desorbing lithium ions.

5. The anode material according to claim 4, wherein the anode active particles are metal or semi-metal particles or compound particles of at least one element selected from a group consisting of Si, Sn, Al, Ge and Pb.

6. An anode material for a lithium-ion battery comprising a carbon particle having a particle size of 5 μm to 30 μm and anode active particles which are capable of absorbing and desorbing lithium ions, and including defective portions on a surface of the carbon particle, the defective portions being holes or pores formed by anodic oxidation of the carbon particle,
   wherein the size of holes or pores is distributed between 500 nm and 1 μm and the carbon particle includes a layer of graphenes having an interlayer space larger than 0.335 nm,
   wherein the anode active particles adhere on the carbon particle, and
   wherein the carbon particle and the anode active particles are cornposited with amorphous carbon layer.

7. A lithium ion battery comprising the anode material according to claim 1.

8. A lithium ion battery comprising the anode material according to claim 2.

9. A lithium ion battery comprising the anode material according to claim 3.

10. A lithium ion battery comprising the anode material according to claim 4.

11. A lithium ion battery comprising the anode material according to claim 5.

* * * * *

UNITED STATES PATENT AND TRADEMARK OFFICE
CERTIFICATE OF CORRECTION

PATENT NO. : 10,601,043 B2
APPLICATION NO. : 15/506813
DATED : March 24, 2020
INVENTOR(S) : Qian Cheng et al.

It is certified that error appears in the above-identified patent and that said Letters Patent is hereby corrected as shown below:

In the Claims

Claim 6, Column 8, Line 20, "cornposited" should read --composited--.

Signed and Sealed this
Seventh Day of July, 2020

Andrei Iancu
*Director of the United States Patent and Trademark Office*